(12) United States Patent
Tkaczyk et al.

(10) Patent No.: US 8,864,417 B2
(45) Date of Patent: Oct. 21, 2014

(54) METHODS OF REEL-LAYING A MECHANICALLY LINED PIPE

(75) Inventors: Tomasz Tkaczyk, Westhill (GB); Aurélien Pepin, Aberdeen (GB)

(73) Assignee: Technip France (FR)

( * ) Notice: Subject to any disclaimer, the term of this patent is extended or adjusted under 35 U.S.C. 154(b) by 289 days.

(21) Appl. No.: 13/502,446

(22) PCT Filed: Oct. 22, 2010

(86) PCT No.: PCT/GB2010/051784
§ 371 (c)(1),
(2), (4) Date: Jun. 21, 2012

(87) PCT Pub. No.: WO2011/048430
PCT Pub. Date: Apr. 28, 2011

(65) Prior Publication Data
US 2012/0257931 A1    Oct. 11, 2012

(30) Foreign Application Priority Data

Oct. 23, 2009  (GB) .................................. 0918589.3
Jun. 1, 2010   (GB) .................................. 1009088.4

(51) Int. Cl.
*F16L 1/16* (2006.01)
*F16L 1/20* (2006.01)
*F16L 1/19* (2006.01)

(52) U.S. Cl.
CPC .. *F16L 1/203* (2013.01); *F16L 1/19* (2013.01)
USPC ....................................... 405/168.3; 406/166

(58) Field of Classification Search
USPC .............................. 405/158, 166, 168.1, 168.3
See application file for complete search history.

(56) References Cited

U.S. PATENT DOCUMENTS

| 4,261,671 A | 4/1981 | Langner |
| 4,332,073 A | 6/1982 | Yoshida ........................ 29/421 |

(Continued)

FOREIGN PATENT DOCUMENTS

| JP | 55-117516 | 9/1980 |
| JP | 57-42458 | 3/1982 |

(Continued)

OTHER PUBLICATIONS

Notification Concerning Transmittal of International Preliminary Report on Patentability with a mailing date of May 3, 2012, International Preliminary Report on Patentability, Written Opinion of the International Searching Authority issued in corresponding International Application No. PCT/GB2010/051784.

(Continued)

*Primary Examiner* — Frederick L Lagman
(74) *Attorney, Agent, or Firm* — Ostrolenk Faber LLP

(57) ABSTRACT

Methods of reel-laying a mechanically lined pipe (MLP) are described. These include the steps of: spooling the MLP (12) onto a reel (10) in the complete or substantial absence of internal pressure above ambient pressure in the MLP; spooling off the MLP from the reel; aligning and straightening the spooled off MLP, in the complete or substantial absence of internal pressure above ambient pressure, to provide an MLP for laying; and/or the steps of: spooling the MLP (12) onto a reel (10) resulting in the formation of wrinkles in the spooled MLP; spooling off the MLP from the reel; aligning and straightening the unspooled MLP to provide an MLP for laying having wrinkles <4 mm high, removing wrinkles, if any, while performing the hydrotest which is used to check fluid tightness of the line. By minimizing the size of the wrinkles and/or particularly selecting the liner of the MLP, the methods of the present invention allow safer, faster spooling and spooling off to be effected to provide safer, faster and more economical laying of an MLP.

18 Claims, 2 Drawing Sheets

(56) References Cited

U.S. PATENT DOCUMENTS

| | | | | |
|---|---|---|---|---|
| 4,334,345 | A | | 6/1982 | Jenks .................... 29/157 |
| 4,421,437 | A | * | 12/1983 | Langner .............. 405/168.3 |
| 4,872,519 | A | | 10/1989 | Kopecki ................ 175/320 |
| 6,167,913 | B1 | | 1/2001 | Wood ...................... 138/98 |
| 2007/0154269 | A1 | * | 7/2007 | Quigley et al. ........ 405/168.3 |
| 2011/0186673 | A1 | | 8/2011 | Howard et al. ........... 242/176 |
| 2012/0269581 | A1 | * | 10/2012 | Mair et al. ............. 405/168.1 |
| 2013/0034390 | A1 | * | 2/2013 | Mair et al. ............. 405/168.3 |
| 2013/0195557 | A1 | * | 8/2013 | Bertaso et al. ........ 405/168.3 |

FOREIGN PATENT DOCUMENTS

| | | |
|---|---|---|
| WO | WO 97/34101 A1 | 9/1997 |
| WO | WO 2004/015321 | 2/2004 |
| WO | WO 2008/072970 | 6/2008 |
| WO | WO 2008/072970 A1 | 6/2008 |

OTHER PUBLICATIONS

UK Search Report dated Apr. 19, 2010, issued in corresponding UK Patent Application No. GB0922286.0. Total 2 pages.

Search Report dated Sep. 14, 2010 issued in corresponding UK patent application 1009088.4 (6 pages).

International Search Report dated Feb. 8, 2011 issued in corresponding international patent application No. PCT/GB2010/051784.

Third Party Observations filed on the equivalent European Patent Application No. 10776125.6, Technip France dated Oct. 23, 2013.

Annex A—Brochure—Cladtek, A Member of the UMW Group, lowest cost CRA flowline solutions, as it was publicly available on http://www.cladtek.com on Sep. 13, 2009, retrieved using http://web.archive.org/web/2009091320754/http://www.cladtek.com/files/resourcemodule/@random48379fa5c8956/1215502623_Cladtek_FlowlineSolutions.pdf.

Annex B—Cladtek International Track Record—Selected Projects—Listing of the provisioning of CRA pipe and lined pipe for project by Cladtek, obtained from Cladtek.

Annex D—"Why Reeling Works", Technip presentation for "2008 Subsea seminar", retrieved from http://www.subseauk.com/documents/rgd00009a%20-%20why%20reeling%20works%20-%20for%20issue.pdf.

Annex E—"Reeling of Tight Fit Pipe", PhD Thesis of Eelke S. Focke, 2007, Delft University of Technology, published in Offshore Engineering Report 2007.OE.010, retrieved from: repository.tudelft.nl/assets/uuid:21348ba3.../ceg focke-20070605.pdf.

Det Norske Veritas Offshore Standard DNV-OS-F101, Submarine Pipeline Systems, Oct. 2007 as amended in Oct. 2008, retrieved from: https://exchange.dnv.com/publishing/Codes/ToC_archive.asp.

European Patent Office Examination Report dated Mar. 10, 2014 issued in corresponding European Patent Application No. 10 776 125.6.

Pan Chu Kong Steel Pipe Co. et al., "CRA Clad & Lined Steel Pipes—Product and Service," Dec. 31, 1993, XP55105461, DOI: GD ICP No. 05091798, Retrieved from the Internet: URL:http://www.pck.com.cn/en/products/products.aspx?productID=10, [retrieved on Mar. 4, 2014] (extract).

\* cited by examiner

METHODS OF REEL-LAYING A MECHANICALLY LINED PIPE

CROSS REFERENCE TO RELATED APPLICATIONS

The present application is a 35 U.S.C. §371 National Phase conversion of PCT/GB2010/051784, filed Oct. 22, 2010, which claims benefit of British Application No. 0918589.3, filed Oct. 23, 2009, and British Application No. 1009088.4, filed Jun. 1, 2010, the disclosures of which are incorporated herein by reference. The PCT International Application was published in the English language.

BACKGROUND OF THE INVENTION

The present invention relates to methods of reel-laying a mechanically lined pipe (MLP), particularly but not exclusively to provide a submarine pipeline; to so-formed and laid MLPs; and to methods of manufacture of such MLPs. It relates also to the MLP itself which is specifically designed to be used in such reel laying methods, including those described in Standard API 5L/ISO 3183:2007 for seamless and welded steel pipes.

Corrosion resistance pipelines for the submarine or otherwise underwater transportation or conveying of corrosive fluids such as gas or crude oil can be provided by pipes having an internal metallic liner. A double-walled or bi-metallic pipe is generally composed of two metallic layers. The outer layer is to provide resistance against buckling on the reel or sea bottom and provides general strength to the design so as to resist to hydrostatic pressure, whilst the internal layer protects the outer layer from damage due to the chemical composition of the fluid being conveyed. The inner layer is sometimes also termed a "liner". As the main purpose is to protect the outer layer from corrosion, a corrosion resistant alloy (CRA) is commonly chosen as the liner.

One form of bi-metallic pipe is a single "clad" pipe having an internal CRA layer metallurgically bonded to the outer layer, which could be formed from a carbon steel base metal.

A second form of bi-metallic pipe can be termed a mechanically lined pipe (MLP), where a liner is fixed to the outer layer (such as carbon steel) without metallurgical bonding. An economic method of forming a lined pipe uses hydraulic and/or mechanical expansion, where the liner is inserted into the outer layer, and then both parts are expanded. During the expansion, the inner pipe undergoes a plastic deformation while the outer layer undergoes either an elastic or a plastic deformation, depending on the manufacturing process. One example of this comprises inserting an alloy 316L liner inside a carbon steel host pipe, and expanding the liner radially so that it comes into contact with the host pipe, and then the host pipe outer diameter will also expand together with the liner to a pre-determined strain level such that, following relaxation of the internal pressure, an interference contact stress between the liner and the host pipe remains.

There are two common methods of laying underwater or submarine pipelines. The so-called 'stove piping method' involves assembling pipe stalks on a pipe-laying vessel, and then welding each one as the laying progresses. In the so-called 'reeled laying method', the pipeline is assembled onshore and spooled onto a large reel, sometimes also termed a storage reel or drum. Once offshore, the pipeline is spooled off from the reel, straightened and/or aligned and finally laid on the seabed. So, no welding is required during the offshore operation, saving time for the vessel operation The reeled laying method is faster and more economical than the stove piping method, such that it is preferred where possible. However, the reeling process obviously generates significant multiple bending strains in the pipeline, which would cause a conventional 2.5-3.0 mm liner in a conventional lined pipe to wrinkle, and it is currently considered that wrinkles are detrimental to an MLP. Thus, all current methods developed to load an MLP onto a reel have been based on the idea that the formation of any wrinkles should be avoided at all costs during the spooling processes.

For this reason, there are currently no commercial applications of the reeled lay method for bi-metallic pipes, and any methods proposed to date for spooling an MLP onto a reel involve maintaining a pressure inside the pipeline during each step of the reeling/unreeling process to avoid the formation of wrinkles. However, a significant volume of pressurized gas will significantly increases the risk of serious injury in case of pipeline failure during reeling/unreeling operations.

For example, WO 2008/072970 A1 discloses a method for laying a pipeline having an inner corrosion proof metallic liner that is held inside an outer pipe material by interference stresses. In its method, a section of the pipeline is reeled onto a pipe laying drum, whilst an overpressure is maintained within the section by means of a pressurised fluid. When the pipeline is motionless, the overpressure is relieved, and a further pipeline section is joined to the first section. A new overpressure is then applied within the sections, and the further section is reeled onto the pipe laying drum.

Whilst this method may assist to avoid wrinkling when the pipeline sections have "mechanical movement" (defined in WO 2008/072970 A1 as meaning reeling the pipeline onto or unwinding the pipeline from the pipe laying drum), this method requires the overpressuring and pressure-relieving steps every increment when two pipe sections are joined. The pipe laying drum is described in WO 2008/072970 A1 as typically having installed "many" pre-fabricated sections, creating significant repetition of the overpressuring and pressure-relieving steps required.

SUMMARY OF THE INVENTION

One object of the present invention is to provide simpler, safer and more practical methods of reel-laying an MLP, in particular a method of spooling and spooling off of an MLP onto and off a reel.

According to a first aspect of the present invention, there is provided a method of reel-laying a mechanically lined pipe (MLP) comprising at least the steps of:

(a) spooling the MLP onto a reel in the complete or substantial absence of internal pressure above ambient pressure in the MLP;

(b) spooling off the MLP from the reel; and (c) straightening the unspooled MLP of step (b) to provide an MLP for laying.

According to this method, the spooling of the MLP in the complete or substantial absence of internal pressure above ambient pressure and the spooling off of the MLP may result in the formation of wrinkles in the liner. But according to another aspect of the invention, these wrinkles should be removed or their height reduced to an acceptable size during a further step of pressuring the pipe during precommisioning.

Also, the height of the wrinkles after spooling off shall have an already acceptable size, preferably less than 2 mm, depending on the thickness of the liner and the bending conditions.

According to one embodiment of the present invention, there is provided the step of:

(b) spooling off the MLP from the reel in the complete or substantial absence of internal pressure above ambient pressure in the MLP.

Thus, the present invention can provide safer and faster spooling or spooling off at ambient pressure within the MLP without stopping for any internal pressuring steps.

After a MLP is spooled off and straightened, it is laid in a submarine environment, usually on a sea bed or similar, and commonly pre-commissioned. This precommissioning phase of the laid pipelines usually Include hydrotesting.

Thus, another embodiment of the present invention further comprises the steps of:

(d) laying the straightened MLP; and
(e) pressurising the laid MLP

Step (e) allows the wrinkles of the MLP liner coming from the manufacturing steps and/or the spooling/spooling off steps to be removed or their height to be reduced to an acceptable size (less than 2 mm). Step (e) should be done in the precommissioning phase.

Preferably, step (e) comprises hydrotesting the MLP, more preferably at a maximum hydrotest pressure in accordance with DNV-OS-F101 (offshore standard, Det Norske Veritas, DNV-OS-F101, submarine pipeline systems, October 2007) where the internal pressure applied for the hydrotest depends on the pipe diameter and wall thickness.

The pressurising of the laid MLP during precommissioning phase can serve to reduce the height of and/or number of wrinkles in the MLP as described above to a height <2 mm or preferably <1 mm. This in effect allows for the first time in practice an MLP to be reel-layed in an economic and timely manner.

The term "internal pressure" as used herein relates to the pressure within the MLP during the method of spooling or spooling off such an MLP onto or off a reel, during a whole or complete process thereof, as opposed to the spooling and/or spooling off processes involving one or more stopping instances or time periods requiring internal pressure or internal pressure changes for the bending or unbending of the MLP. The spooling of step (a) is preferably wholly or substantially continuous or otherwise on-going or uninterrupted, compared to previous stop-start spooling processes.

The term "straightening" as used herein includes one or more processes or steps of making the MLP straight after it has been spooled and spooled off from the reel, and before it is delivered to its intended laying position or location. This can include one or more bending cycles, alignments and/or straightening steps, usually before the MLP enters the marine environment. The reeled lay method generally involves at least the steps of aligning and straightening the MLP.

It is known that the extent of wrinkles formed in reeling an MLP depends on one or more of the following group: the interference contact stresses in the liner, the liner size, the radial insertion gap, liner yield strength, liner strain hardening; the tensile response of the liner material, the applied bending strain, and the number of reverse bending cycles. There are two reverse bending cycles during a typical reeling operation, and there may be as many as five bending cycles during a contingency re-reeling operation.

The maximum bending strain (nominal bending strain) during reeling depends on the pipe outer diameter and reel or aligner radius, whichever is smaller.

A high interference contact stress has a very beneficial effect on the liner wrinkling and may reduce or even prevent wrinkling of the liner, especially on the first application of bending. However it is known that it is very difficult to control the target interference contact stress during MLP manufacturing, and that a high variation of interference contact stress is expected. Moreover it is known that the interference contact stress may be released due to other actions which are applied to the MLP, an example of which can be seen in one method where the application of the external coating of the MLP at a high temperature will reduce interference contact stress due to high thermal expansion coefficient of materials used for liners compared to that of the carbon steel used for host pipe.

The present invention is based on the analysis that residual wrinkles coming from the manufacturing or from the reeling steps (spooling and spooling off) with a maximum height of no more than 6 mm and preferably less than 4 mm can be removed or their height be reduced to an acceptable size (less than 2 mm) during the subsequent straightening and/or pre-commissioning, in particular during hydrotesting which is used to check fluid tightness of the line.

Furthermore, according to another feature of the invention, by increasing the wall thickness of the inner liner of the MLP over a minimum liner wall thickness determined according to the invention, the residual wrinkles after the reeling steps (spooling and spooling off) will have a maximum height of no more than 4 mm and preferably no more than 2 mm, as such wrinkles shall be at an acceptable size after reeling steps and/or be removed or their height reduced during the subsequent straightening and/or pre-commissioning, in-particular during hydrotesting.

By minimising the size of the wrinkles and/or particularly selecting the liner of the MLP, the methods of the present invention allow faster spooling and spooling off to be effected to provide faster, safer and so more economical reel-laying of an MLP.

According to one particular embodiment of the present invention, the liner is equal or thicker than the minimum liner thickness "t", defined by the formula one (I):

$$D/t + 1406\, D/R = 96.1 \tag{I}$$

wherein:

D is the liner outer diameter;

R is the smallest bending radius of the reel; and t is the minimum liner thickness of the liner. In this formula, the smallest bending radius of the reel means the radius of the reel on which the pipe is to be spooled or the radius of the aligner of the laying vessel or any other reel on which the pipe is to be bent before it is straightened and laid whichever is the smallest.

The bending radius of a reel can be as low as 1.5 m, and go up to 10 m or more. The radius of the reel and spooled pipe obviously increases as the pipe is reeled onto the reel. One typical example of a reel for laying a marine pipeline has a smallest reel bending radius of 8.23 m.

According to another particular embodiment of the present invention, the minimum liner thickness "t" shall be calculated using another formula involving the factors of maximum reeling strain and the radial insertion gap as discussed below. The minimum liner thickness that can be reeled and unreeled as described herein can be determined from the below formula two (II):

$$t = a_{00}(\epsilon D^{0.75})^0 g^0 + a_{01}(\epsilon D^{0.75})^0 g^1 + a_{10}(\epsilon D^{0.75})^1 g^0 + \\ a_{11}(\epsilon D^{0.75})^1 g^1 + a_{20}(\epsilon D^{0.75})^2 g^0 + a_{21}(\epsilon D^{0.75})^2 g^1 + \\ 0.16$$

where $a_{00}, a_{01}, \ldots$ are constants given in Table 1, $\epsilon$ is the maximum reeling strain or nominal strain which can be calculated as follows:

$$\varepsilon = \frac{\frac{D_H}{2}}{\frac{D_H}{2} + R}$$

where $D_H$ is the outer diameter of the host pipe and R is the smallest bending radius of the reel. The smallest bending radius of the reel means the radius of the reel on which the pipe is to be spooled or the radius of the aligner of the laying vessel or any other reel on which the pipe is to be bent before it is straightened and laid whichever is the smallest g is the radial insertion gap in mm and $D=D_H-2t_H$ is the liner outer diameter, where $D_H$ and $t_H$ is respectively the outer diameter and wall thickness of the host pipe in mm.

Using the index notation we write $t=a_{ij}(\varepsilon D^{0.75})^i g^j + 0.16$ where $i=0,1,2$ and $j=0,1$ All dimensions in the above equations are in millimeters.

TABLE 1

Constants in Formula for Minimum Liner Thickness

| ij | $a_{ij}$ |
|---|---|
| 00 | 2.39846 |
| 01 | −0.239488 |
| 10 | −5.48161 |
| 11 | 2.35153 |
| 20 | 6.50598 |
| 21 | −1.37840 |

The above formula(II) allow pre-installation calculation of the minimum liner thickness that allow the MLP to be reeled and unreeled as defined herein.

One or both of the above formulas can provide the minimum wall thickness for a liner to be used within the reel laying method of the invention.

An MLP can then be designed and manufactured to have a liner thickness thicker or at least equal to the minimum liner thickness according to these calculations such that it can then be directly loaded onto a reel in a conventional manner without requiring any internal pressure either fully or in sections. After the reeling process (spooling on, spooling off and associated straightening as require), the residual wrinkles in the MLP formed during the reeling/unreeling processes will only have a height of no more than 4 mm, which may be further decreased with pressure applied during a pre-commissioning operation such as hydrotesting.

Whilst the present invention can calculate a range of liner thicknesses, and in particular minimum liner wall thicknesses, one or more other requirements or desires may still result in the use in practice of a liner wall thickness greater than the possible minimum. Mechanically lined pipes MLP can be formed with any number of layers, liners, coating etc., known in the art, but including at least one 'outer layer' or 'outer pipe' or 'host pipe', such as a carbon steel outer pipe, fixed to at least one 'inner layer' or 'liner', one such liner preferably being formed from a corrosion resistant alloy (CRA), for example a liner such as an alloy 316L, 825, 625 or 904L, without metallurgical bonding.

According to another embodiment of the present invention, the MLP is a multi-section pipe. For example, the MLP could be pre-assembled from a number of smaller pipe sections prior to use with the present invention. Such pipe sections may extend from several meters long up to approximately 1 km long, or be greater than 1 km long. Methods and apparatus for joining two pipe sections are well known in the art and are not described herein in detail. Generally the joining comprises one or more welds, such as tie-in welds. The two pipe sections form a combined pipe section. Typically, a reeled pipeline for subsequent laying via the reeled lay method can be many pipe sections, and so many kilometers, long.

According to a third aspect of the present invention, there is provided a method of laying and hydrotesting a mechanically lined pipe (MLP) in a marine environment comprising;
(i) spooling the MLP onto a reel;
(ii) spooling off and straightening the spooled MLP of step (i);
(iii) laying the MLP in a marine environment; and
(iv) hydrotesting the laid MLP to remove wrinkles.

Generally, after hydrotesting, any residual wrinkles in the MLP will be less than 2 mm high and preferably less than 1 mm high, unless in the instance of mismatched pipe where local wrinkles may be increased due to mismatch.

Preferably, the method of laying a MLP further comprises one or more of the features and/or embodiments described herein.

The present invention extends to a method comprising any combination of the above aspects and embodiments, such as to a combination of a method of spooling and spooling off an MLP onto and off a reel followed by pre-commissioning the MLP as described above.

If necessary, the hydrotesting is able to remove or reduce any residual wrinkles in the laid MLP to be less than 6 mm high.

According to further aspects of the present invention, there are provided one or more of:

a mechanically lined pipe useable in a method as defined herein above having a liner with a wall thickness >2.5 mm, preferably ≥3 mm;

a mechanically lined pipe laid as defined herein above comprising wrinkles <2 mm high after precommissionning.

a mechanically lined pipe as defined herein above comprising after the spooling off step wrinkles <6 mm high.

a mechanically lined pipe (MLP) spooled on a reel in the complete or substantial absence of internal pressure above ambient pressure in the MLP during spooling;

a mechanically lined pipe having a liner thickness at least equal to the minimum liner thickness "t" defined by formula (I) as defined herein above; and.

a mechanically lined pipe having a liner thickness at least equal to the minimum liner thickness "t" defined by formula (II) as defined herein above.

Such MLPs may further comprise one or more of;
a carbon steel outer pipe; and
a liner with a thickness ≥3 mm.

Such MLPs may also be in the form of a multi-section pipe.

According to a yet further aspect of the present invention, there is provided a method of manufacturing an MLP to be reel laid as per the invention by designing the liner to be inserted in the host pipe with a thickness thicker or at least equal to the minimum liner thickness calculated according to formula (I) or formula (II) or both as defined herein above; and inserting the liner into the outer pipe to form the MLP.

Thus, according to another aspect of the present invention, there is provided a method of manufacturing and laying a mechanically lined pipe (MLP) having an outer pipe and a liner comprising the steps of:
manufacturing the MLP as defined herein above; and
laying the MLP as defined herein above.

The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements from any of the embodiments to describe additional embodiments.

Thus, various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one embodiment can typically be combined alone or together with other features in different embodiments of the invention.

Various embodiments and aspects of the invention will now be described in detail with reference to the accompanying drawings. Still other aspects, features, and advantages of the present invention are readily apparent from the entire description thereof, including the figures, which illustrates a number of exemplary embodiments and aspects and implementations. The invention is also capable of other and different embodiments and aspects, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

BRIEF DESCRIPTION OF THE DRAWINGS

Embodiments of the present invention will now be described by way of example only, and with reference to the accompanying drawings in which.

DESCRIPTION OF PREFERRED EMBODIMENTS

The present invention provides a number of steps for methods for spooling, spooling off, aligning, straightening and pre-commissioning a mechanically lined pipe, preferably being part of a method of laying and commissioning a submarine pipeline.

Figure 1:
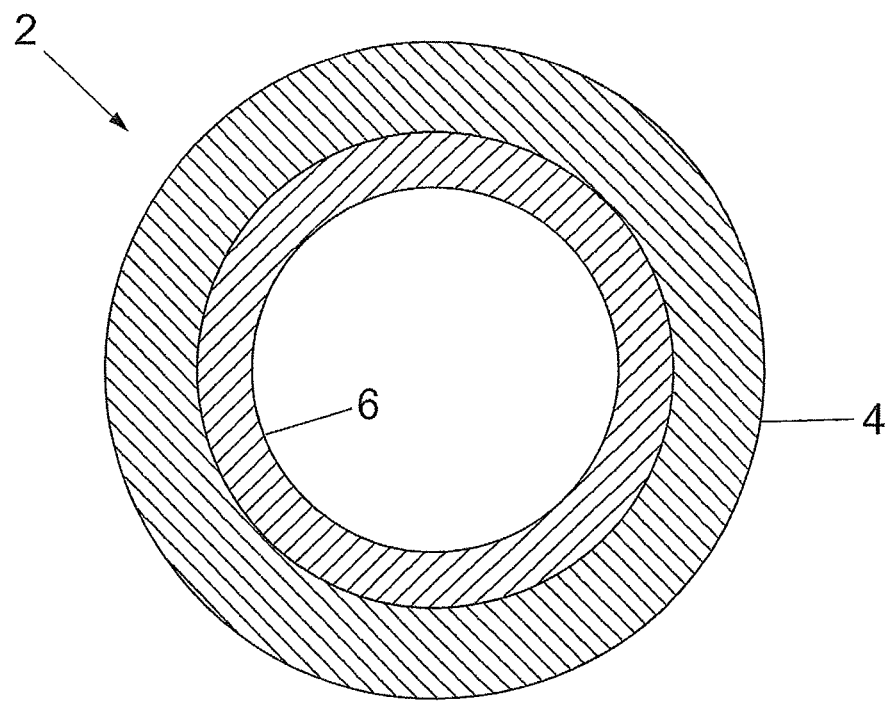
FIG. 1 is a schematic cross-sectional view of an MLP.

FIG. 1 shows a schematic cross-sectional view of parts of a mechanically lined pipe (MLP) 2. The MLP 2 generally comprises a number of layers (including coating), only two of which are shown in FIG. 1 for clarity, comprising an outer layer 4 which can be a carbon steel pipe, and an inner layer or liner 6 being formed from a corrosion resistant alloy (CRA), such as alloy 316L. The relative dimensions shown in FIG. 1 are not to scale, and are provided for clarity of representation.

In the conventional manufacture of an MLP, an inner layer is usually provided into an outer layer and then expanded to provide an interference contact stress between the two layers. However, bending of a pipe formed from two such layers, such as spooling on or off the reel, was assumed to create wrinkles which could not be removed after spooling off, and which were therefore considered to be sufficiently detrimental to the laid pipeline that the forming of any wrinkles should be avoided at all costs.

Thus, for such laying methods, a high interference contact stress is desired between the inner and outer layers to prevent wrinkling of the inner liner compared with the outer layer. The interference contact stress can be lost during the coating procedure and will certainly be lost on plastic deformation which occurs during bending. However, if interference stress is lost during the $1^{st}$ or $2^{nd}$ strain event then wrinkles will usually appear in the $3^{rd}$ or $4^{th}$ strain event. It can also be difficult to control the degree of intended interference contract stress during manufacturing of such pipes, and a high degree of variation of force occurs in practice. Thus, the art presently does not consider MLPs are useable in the reeled lay method and a number of unsafe, complicated and time consuming method which involve internal pressuring steps with large volumes of gas such as shown in WO2008/072970 have been proposed to solve the above wrinkling issue.

A surprising finding by the present applicants is that some (small, generally in the range 4-6 mm) wrinkling of the inner liner can be tolerated during bending of an MLP, as such wrinkles can subsequently be removed when pressure is applied to the inside of the MLP. Such a pressure could be applied during the pre-commissioning of a laid submarine pipeline, for example during its hydrotesting.

Thus, the present invention is based on the ability to bend an MLP, in particular onto and off a reel and through an aligner and a straightener, wherein at the end of the process there are often no wrinkles or the residual wrinkles are not greater than <6 mm, often <4 mm high after the subsequent steps of aligning and straightening the MLP. As the prior art methods for reeling an MLP involve the use of internal pressure within the MLP, it is a surprising advantage of the present invention to be able to provide a method of reeling, unreeling, aligning and straightening an MLP in the complete or substantial absence of internal pressure above ambient pressure in the MLP.

Once the unspooled MLP has gone through the aligner 20 and one or more straighteners 22 it passes below the vessel 14 and it is laid on the seabed 18. Once on the seabed if residual wrinkles are still present in the range of 4-6 mm, they will be removed by the low pressure required during the hydrotest of the MLP in the precommissioning phase. The laid marine pipe 12a will then have no or negligible wrinkles.

Figure 2:
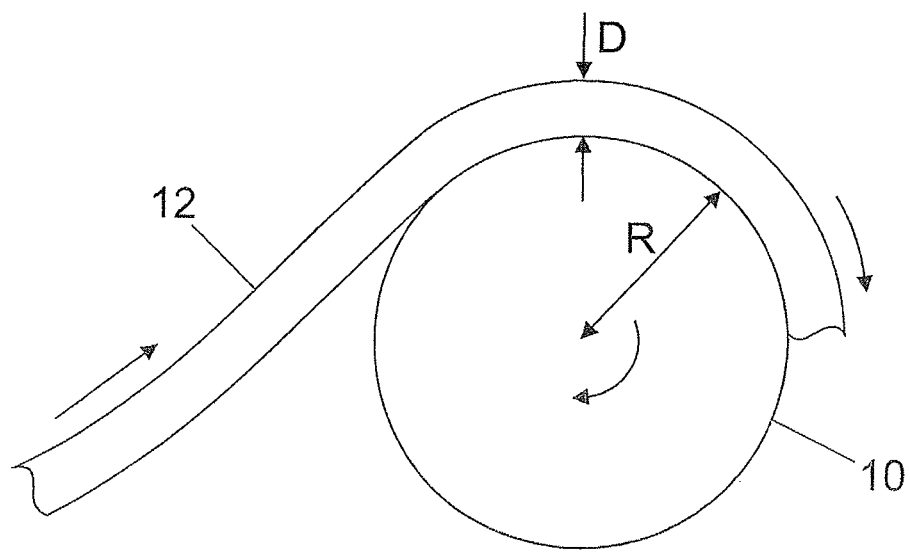
FIG. 2 is a diagrammatic cross-sectional view of a method of spooling an MLP onto a reel.

FIG. 2 shows a diagrammatic reel 10 having a smallest bending radius "R", and a mechanically lined pipe (MLP) 12 having an outer pipe diameter "D". The MLP may be formed in sections joined together to form a single pipe. Sections are normally 1 km long, but can be longer or smaller as required. FIG. 2 shows spooling of the MLP 12 onto the reel 10.

By way of example only, the reel 10 could have a bending radius R of 8.23 m, and the MLP 12 could have a diameter D of 12.75 inches (323.9 mm) and a wall thickness of 15.9 mm.

An improvement to the invention is to choose a liner with a thickness at least equal to a minimum liner thickness that could be calculated according to formulas (I) or (II) given above.

The formula (II) as follows allows to calculate the minimum liner thickness, based on various parameters as discussed herein:

Using the index notation we write:

$$t = a_{ij}(\epsilon D^{0.75})^i g^j + 0.16 \text{ where } i=0,1,2 \text{ and } j=0,1$$

Figure 3:
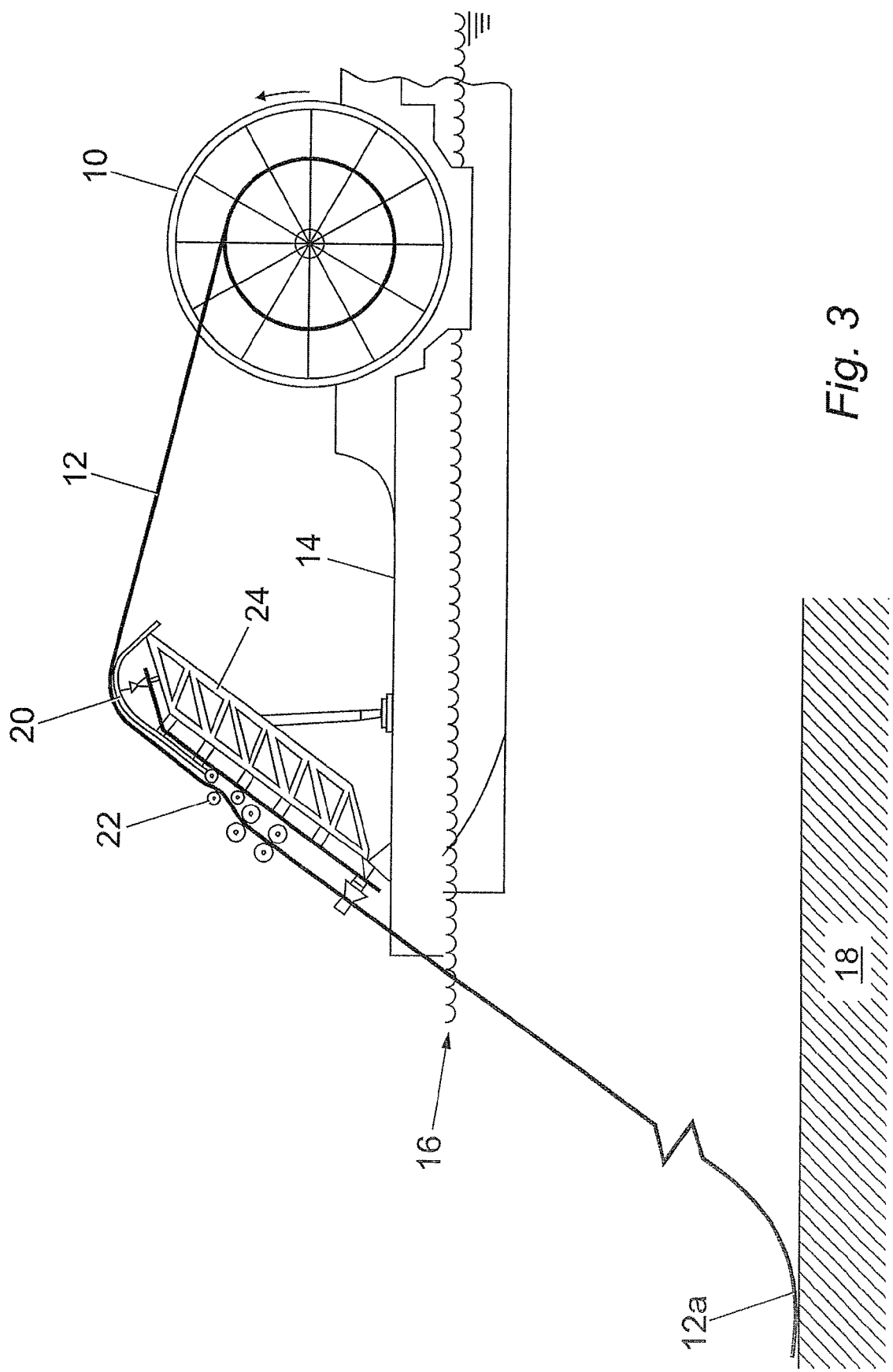
FIG. 3 is a diagrammatic cross-sectional view of the reel lay method, which illustrates the spooling off, aligning, straightening and laying an MLP from a reel.

FIG. 3 shows a method of directly and simply spooling off the spooled MLP 12 from the reel 10 located on a suitable vessel 14 at a sea surface 16, to a seabed 18; generally known as the reeled lay method. According to the present invention, the method of spooling off the MLP 12 from the reel 10 can be carried out in the complete or substantial absence of internal pressure above ambient pressure in the MLP 12, making the process simple and relatively fast.

The spooled off MLP provides a laid marine pipeline 12*a* after it has been straightened by passing through an aligner 20 and one or more straighteners 22 such as through tensioners prior to passing below the vessel 14 to be laid on the seabed 18.

Pre-commissioning of the laid MLP 12*a* usually involves pressurising the laid MLP 12*a*. Such pressurising can generally be provided by passing a pressurised fluid such as water along the laid pipeline 12*a*, an example being hydrotesting that is provided during a pre-commissioning process for a marine pipeline, generally at a pressure such as 30-40 MPa.

Either after straightening and/or after such pressurising, wrinkles in the spooled off MLP 12 have been removed or reduced to having a height of <1-2 mm.

In-particular, a combination of FIGS. 2 and 3 show a method of laying a mechanically lined pipe (MLP) 12 in a marine environment comprising;
  (i) spooling the MLP 12 onto a reel 10;
  (ii) spooling off the MLP 12 of step (i) from the reel 10 and directing the MLP 12 to the aligner 20 of a lay tower 24 (during which the MLP 12 undergoes a reverse plastic bending such that the MLP 12 is or may be almost fully straightened in the span between the reel 10 and the aligner 20), and then to the straightener 22 of the lay tower 24 in order to lay the MLP 12 in a marine environment as a marine pipeline 12*a*; and
  (iii) hydrotesting (not shown) the laid MLP 12*a* of step (ii) to remove wrinkles in the MLP 12*a* once on the seabed 18.

As this concept allows to spool onto a reel and/or to spool off from the reel a MLP without requiring the MLP to have an internal pressure such as that shown in WO2008/072970, this operation is much safer. The spooling and/or spooling off process can be carried out at a much faster rate than in WO2008/072970, reducing the OPEX for such operations, and thus the overall time required to lay an MLP. Where such MLPs are many kilometers long, this provides a significant operational time and cost saving, based on significantly simpler methods as described herein above.

WO9734101A discloses the use of temporary bonding in bi-metal lined piping to control the separation between the liner and the outer layer during bending. Its invention resides in the formation of a bond between the outer pipe and liner which is compatible with the relevant manufacturing and reeling processes, and may include the use of a bonding agent or mechanism in combination, possibly in combination with a conventional friction-bonding process, such as cold expansion or shrink fit. Such a bonding technique must be able to withstand the tensile strains produced in the longitudinal axial direction along the outer/liner interface during pipe bending and must be tolerant of the temperatures encountered during shrink fitting.

WO9734101A describes the use of a pipe comprising a carbon steel outer pipe and a liner of corrosion resistant metal, in which the liner is secured along its length to the inner surface of the outer pipe by circumferential fixing means having a circumferential shear strength greater than the circumferential shear stress which would be induced by bending the pipe to a predetermined minimum radius of curvature. The means of circumferential fixing securing the liner to the outer pipe include:

adhesive agents selected to provide a circumferential shear strength greater than the circumferential shear stress which will be induced by bending a given combination outer pipe and liner to a predetermined radius;

soldering, brazing or other similar technique to produce a mechanically acceptable bond between the liner and the outer pipe without fusing the bulk material;

mechanical interlocking of the liner and outer pipe; and solid-phase welding, such as electrical resistance spot welding from the interior of the liner.

The use of circumferential bonding described in WO9734101A can be combined with a liner of increased wall thickness according to the present invention to further reduce the number of reeling-induced wrinkles and their height after laying.

Examples 1 and 2

The inventors performed full scale bending and pressure tests on three 6.625" (168 mm) lined pipes as Example 1 and three 12.75" (324 mm) lined pipes as Example 2.

The minimum reelable liner thicknesses to provide residual wrinkle heights of a maximum of approximately 3 mm was calculated using formula (II) above.

For Example 1 using the 6.625" lined pipe, the minimum liner thickness was 3.0 mm assuming an insertion gap of 3.2 mm. Thus, in actual testing, a 3 mm 904L liner was used; see Table 3 below for more details.

For Example 2 using the 12.75" lined pipe, the minimum liner thickness was 7.5 mm assuming an insertion gap of 5 mm. Thus, in actual testing, a 7.5 mm 316L liner was use: see Table 3 below for more details.

TABLE 3

| Nominal outer diameter of host pipe | 6.625" (168.3 mm) | 12.75" (323.9 mm) |
|---|---|---|
| Nominal host pipe thickness | 11.0 | 19.1 |
| Grade of host pipe | X65 | X65 |
| Minimum liner thickness (from test) | 3 mm | 7.5 mm |
| Minimum liner thickness (formula I) | 2.05 | 4.94 |
| Minimum liner thickness (formula II) | 3.02 | 7.55 |
| Liner material | 904L | 316L |
| Radial insertion gap | 3.2 mm | 5.0 mm |

Following manufacture, each test pipe was subjected to three reverse bending cycles, although only two are required for the reeling process giving the test a level of conservatism. The 6.625" pipes were bent onto an 8.3 m radius reeling former while the 12.75" pipes were bent onto a 10.5 m radius former. After each bending cycle, the 6.625" and 12.75" lined pipes were straightened using a 25 m and a 47 m radius straightening former respectively.

Wrinkle heights were measured using a laser profiler after three bending cycles, although only two cycles are required. The heights of reeling induced wrinkles were in fact all below 1 mm, well below the intended 3 mm.

Various modifications and variations to the described embodiment of the invention will be apparent to those skilled in the art without departing from the scope of the invention as defined in the appended claims. Although the invention has been described in connection with a specific preferred embodiment, it should be understood that the invention as claimed should not be unduly limited to such specific embodiment

What is claimed is:
1. A method of reel-laying a mechanically lined pipe (MLP), the method comprising:
  (a) spooling the MLP onto a reel in complete or substantial absence of internal pressure above ambient pressure in the MLP;

(b) spooling off the MLP from the reel in the complete or substantial absence of internal pressure above ambient pressure in the MLP;

(c) straightening the spooled off MLP of step (b) to provide the MLP for laying; and hydrotesting the MLP to reduce wrinkles, generally any residual wrinkles caused by manufacturing and or installation, in the MLP to an acceptable height <2 mm high.

2. A method as claimed in claim 1 further comprising the steps of:
  (d) laying the straightened MLP; and
  (e) pressurising the laid MLP.

3. A method as claimed in claim 1 wherein the MLP comprises a carbon steel outer pipe.

4. A method as claimed in claim 1 wherein the MLP comprises a Corrosion Resistant Alloy (CRA) liner.

5. A method as claimed in claim 4 wherein the CRA liner has a thickness >2.5 mm, preferably >3 mm.

6. A method as claimed in claim 1 further comprising before step (a), the step of providing an MLP for spooling having a liner thickness at least equal to the minimum liner thickness "t" calculated by formula two (II):

$$t = a_{00}(\epsilon D^{0.75})^0 g^0 + a_{01}(\epsilon D^{0.75})^0 g^1 + a_{10}(\epsilon D^{0.75})^1 g^0 + a_{11}(\epsilon D^{0.75})^1 g^1 + a_{20}(\epsilon D^{0.75})^2 g^0 + a_{21}(\epsilon D^{0.75})^2 g^1 + 0.16$$

wherein:

t is the minimum liner thickness in mm:

$a_{00}, a_{01}$, are constants defined by Table 1:

| ij | $a_{ij}$ |
|----|----------|
| 00 | 2.39846 |
| 01 | −0.239488 |
| 10 | −5.48161 |
| 11 | 2.35153 |
| 20 | 6.50598 |
| 21 | −1.37840 |

$\epsilon$ is the maximum reeling strain, g is the radial insertion gap in mm, and $D = D_H - 2t_H$ is the liner outer diameter in mm, where $D_H$ and $t_H$ are respectively the outer diameter and wall thickness of the host or outer pipe of the MLP in mm.

7. A method as claimed in claim 1 further comprising before step (a), the step of providing an MLP for spooling having a liner thickness at least equal to the minimum liner thickness "t" calculated by formula one (I)

$$D/t + 1406 D/R = 96.1 \quad (I)$$

wherein:

D is the liner outer diameter;

R is the smallest bending radius of the reel; and t is the minimum liner thickness of the liner.

8. A method as claimed in claim 1 wherein the liner is alloy 316L, 825, 625 or 904L.

9. A method as claimed in claim 1 wherein the MLP is a multi-section pipe.

10. A mechanically lined pipe useable in a method as defined in claim 1, the pipe comprising a liner with a wall thickness >2.5 mm.

11. The mechanically lined pipe of claim 10, wherein the liner has a wall thickness of >3 mm.

12. A mechanically lined pipe laid according to claim 1 comprising wrinkles <2 mm high.

13. A mechanically lined pipe laid according to claim 1 comprising wrinkles after spooling off of step (b) <6 mm high.

14. A method of reel-laying and hydrotesting a MLP, the method comprising at least the steps of:
  (a) spooling the MLP onto a reel in a complete or substantial absence of internal pressure above ambient pressure in the MLP resulting in the formation of wrinkles in the spooled MLP;
  (b) spooling off the MLP from the reel in the complete or substantial absence of internal pressure above ambient pressure in the MLP;
  (c) straightening the spooled off MLP of step (b)
  (d) laying the MLP of step (c); and
  (e) hydrotesting the laid MLP to provide the laid MLP wholly or substantially having wrinkles, resulting from manufacturing or installation process, <2 mm high.

15. A method of manufacturing and laying a mechanically lined pipe (MLP) having an outer pipe and a liner for reel-laying comprising the steps of providing a liner having a thickness at least equal to the minimum liner thickness "t" calculated by formula two (II):

$$t = a_{00}(\epsilon D^{0.75})^0 g^0 a_{0.1}(\epsilon D^{0.75})^0 g^1 + a_{10}(\epsilon D^{0.75})^1 g^0 a_{11}(\epsilon D^{0.75})^1 g^1 + a_{20}(\epsilon D^{0.75})^2 g^0 + a_{21}(\epsilon D^{0.75}) g^1 + 0.16$$

wherein:

t is the minimum liner thickness in mm, $a_{00}, a_{01}$, are constants defined by Table 1:

| ij | $a_{ij}$ |
|----|----------|
| 00 | 2.39846 |
| 01 | −0.239488 |
| 10 | −5.48161 |
| 11 | 2.35153 |
| 20 | 6.50598 |
| 21 | −1.37840 |

$\epsilon$ is the maximum reeling strain, g is the radial insertion gap in mm, and $D = D_H - 2t_H$ is the liner outer diameter in mm, where $D_H$ and $t_H$ are respectively the outer diameter and wall thickness of the host or outer pipe of the MLP in mm;

and inserting the liner into the outer pipe to form the MLP, wherein after the MLP is layed, the method comprises:

hydrotesting the MLP to reduce wrinkles, generally any residual wrinkles caused by manufacturing and or installation, in the MLP to an acceptable height <2 mm high.

16. A method of manufacturing and laying a mechanically lined pipe (MLP) having an outer pipe and a liner comprising the steps of:

manufacturing the MLP according to claim 15; and laying the MLP comprising the steps of:
  (a) spooling the MLP onto a reel in the complete or substantial absence of internal pressure above ambient pressure in the MLP;
  (b) spooling off the MLP from the reel; and
  (c) straightening the spooled off MLP of step (b) to provide an MLP for laying.

17. A method of manufacturing a mechanically lined pipe (MLP) having an outer pipe and a liner for reel-laying comprising the steps of providing a liner having a thickness at least equal to the minimum liner thickness "t" calculated by formula one (I): $D/t + 1406 D/R = 96.1$; and inserting the liner into the outer pipe to form the MLP, wherein:

D is the liner outer diameter,

R is the smallest bending radius of the reel, and t is the minimum liner thickness of the liner.

18. A method of manufacturing and laying a mechanically lined pipe (MLP) having an outer pipe and a liner, the method comprising the steps of:
   manufacturing the MLP according to claim 17; and
   laying the MLP comprising the steps of:
   (a) spooling the MLP onto a reel in the complete or substantial absence of internal pressure above ambient pressure in the MLP;
   (b) spooling off the MLP from the reel; and
   (c) straightening the spooled off MLP of step (b) to provide an MLP for laying
   wherein after the MLP is layed, the method further comprises:
   hydrotesting the MLP to reduce wrinkles, generally any residual wrinkles caused by manufacturing and or installation, in the MLP to an acceptable height <2 mm high.

* * * * *